(12) United States Patent
Shaw et al.

(10) Patent No.: US 9,736,553 B2
(45) Date of Patent: *Aug. 15, 2017

(54) SYSTEM AND METHOD FOR MANAGING SENSOR NETWORK UPLINK AND DOWNLINK COMMUNICATIONS

(71) Applicant: AT&T Intellectual Property I, LP, Atlanta, GA (US)

(72) Inventors: Venson M. Shaw, Kirkland, WA (US); Jin He, Fremont, CA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/090,226

(22) Filed: Apr. 4, 2016

(65) Prior Publication Data

US 2016/0219349 A1   Jul. 28, 2016

Related U.S. Application Data

(63) Continuation of application No. 13/712,436, filed on Dec. 12, 2012, now Pat. No. 9,311,803.

(51) Int. Cl.
  *H04Q 9/00* (2006.01)
  *H04W 4/00* (2009.01)
  *G06Q 10/08* (2012.01)
  *G06Q 20/32* (2012.01)
  *G08B 21/02* (2006.01)

(52) U.S. Cl.
  CPC ............. *H04Q 9/00* (2013.01); *G06Q 10/083* (2013.01); *G06Q 20/325* (2013.01); *G08B 21/0241* (2013.01); *G08B 21/0277* (2013.01); *H04W 4/006* (2013.01); *H04Q 2209/10* (2013.01)

(58) Field of Classification Search
  CPC ............ G08B 21/0241; G08B 21/0261; G08B 21/0263; G08B 21/0266; G08B 21/0269; G08B 21/0272; G08B 21/0275; G08B 21/0277; G06Q 10/083; G06Q 10/0833; G06Q 10/0835; G06Q 10/0836; G06Q 20/32; G06Q 20/327; G06W 20/325;
  (Continued)

(56) References Cited

U.S. PATENT DOCUMENTS 5,774,876 A * 6/1998 Woolley ................ G01S 5/0289
   235/385
5,804,810 A * 9/1998 Woolley ................ G01S 5/0289
   235/375

(Continued)

*Primary Examiner* — Van Trieu
(74) *Attorney, Agent, or Firm* — Baker & Hostetler LLP

(57) ABSTRACT

A network includes a supervisory sensor in communication with a wireless network and a non-supervisory sensor in communication with the supervisory sensor, wherein the non-supervisory sensor communicates with the wireless network through the supervisory sensor. The supervisory sensor may be configured to receive downloads from a server communicating through the wireless network and to collect data from the non-supervisory sensor. The supervisory sensor may be configured to transmit the collected data to a server on the wireless network. Moreover, the non-supervisory sensor and the supervisory sensor each have an active state and an inactive state and wherein the supervisory sensor may be in the active state while the non-supervisory sensor is in the inactive state.

20 Claims, 7 Drawing Sheets

(58) Field of Classification Search
CPC ......... H04W 4/00; H04W 4/008; H04W 4/02; H04W 88/00; G04W 4/006
See application file for complete search history.

(56) References Cited

U.S. PATENT DOCUMENTS

| | | | |
|---|---|---|---|
| 5,892,441 A * | 4/1999 | Woolley | G01S 5/0289 235/384 |
| 5,959,568 A | 9/1999 | Woolley | |
| 7,057,512 B2 * | 6/2006 | Stilp | G08B 13/24 340/10.3 |
| 7,079,020 B2 * | 7/2006 | Stilp | G06K 7/0008 340/506 |
| 7,323,991 B1 | 1/2008 | Eckert et al. | |
| 8,718,582 B2 * | 5/2014 | See | H03F 1/0244 330/278 |
| 8,718,598 B2 | 5/2014 | Johnson | |
| 9,311,803 B2 * | 4/2016 | Shaw | H04Q 9/00 |
| 2012/0052879 A1 * | 3/2012 | Wildon | A45C 13/18 455/456.1 |
| 2013/0339498 A1 * | 12/2013 | Johnson | H04W 4/02 709/221 |

\* cited by examiner

SYSTEM AND METHOD FOR MANAGING SENSOR NETWORK UPLINK AND DOWNLINK COMMUNICATIONS

CROSS REFERENCE TO RELATED PATENT APPLICATIONS

This application is a continuation application U.S. patent application Ser. No. 13/712,436, filed Dec. 12, 2012 now U.S. Pat. No. 9,311,803, which is incorporated herein by reference in its entirety.

TECHNICAL FIELD

The technical field generally relates to wireless communications, and more specifically relates to networking of sensors in a telecommunications system.

BACKGROUND

Long Term Evolution (LTE) is rapidly being deployed in cellular networks. LTE technology offers high speed bandwidth for the provision of applications and other data services. One aspect of applications taking advantage of the increased bandwidth is machine-to-machine (M2M) communications. M2M communications permit users to deploy, manage and control a wide range of sensors for use on or in appliances, automobiles, security systems, transportation systems, and the like.

Sensors operating on cellular networks are typically treated as normal cellular telephone devices having a unique one-to-one relationship with the network. Each sensor must have its own network ID and network authentication capability. Such a device is typically always connected to the network and therefore is consuming resources in terms of both signaling and data communications. Moreover, the necessity of the sensors being always "on" may be a drain on power to the device itself. This configuration is extremely costly and inefficient.

SUMMARY

The following presents a simplified summary that describes some aspects or embodiments of the subject disclosure. This summary is not an extensive overview of the disclosure. Indeed, additional or alternative embodiments of the subject disclosure may be available beyond those described in the summary.

In an example, a network is disclosed including a supervisory sensor in communication with a wireless network and a non-supervisory sensor in communication with the supervisory sensor, wherein the non-supervisory sensor communicates with the wireless network through the supervisory sensor. The supervisory sensor may be configured to receive downloads from a server communicating through the wireless network and to collect data from the non-supervisory sensor. The supervisory sensor may be configured to transmit the collected data to a server on the wireless network. Moreover, the non-supervisory sensor and the supervisory sensor each have an active state and an inactive state and wherein the supervisory sensor may be in the active state while the non-supervisory sensor is in the inactive state. The supervisory sensor is configured to change to the inactive state based on one or more criteria, wherein that criteria is one of time of day, location or network congestion.

In another example, a supervisory sensor may include a sensor component, a first communication interface configured for communication with a non-supervisory sensor; and a second communication interfaced configured for communicating wirelessly with a server over a wireless network. The supervisory sensory may be configured to obtain first data from the sensor component, obtain second data from the non-supervisory sensor, and transmit the first data and the second data to the server. The supervisory sensor may also be configured to receive a command from the server to transfer supervisory functions to the non-supervisory sensor and upon execution of the command, disable the second communication interface. The supervisory sensor may be configured to cycle between an active state and an inactive state.

The disclosure is also directed to a method of collecting data including establishing a network of sensors and appointing a supervisory sensor, wherein the supervisory sensor is configured to communicate with the network of sensors and a wireless network. The method may further include transmitting commands to the supervisory sensor using a downlink communications path of the wireless network and receiving sensor data from the supervisory data using the uplink communications path. The sensor data may include only data from the supervisory sensor and may also include data from at least one sensor that is not the supervisory sensor.

BRIEF DESCRIPTION OF THE DRAWINGS

Reference is made here to the accompanying drawings, which are not necessarily drawn to scale.

DETAILED DESCRIPTION OF ILLUSTRATIVE EMBODIMENTS

Aspects of the instant disclosure are described more fully herein with reference to the accompanying drawings, in which example embodiments are shown. In the following description, for purposes of explanation, numerous specific details are set forth in order to provide an understanding of the various embodiments. However, the instant disclosure may be embodied in many different forms and should not be construed as limited to the example embodiments set forth herein. Like numbers refer to like elements throughout.

Figure 1:
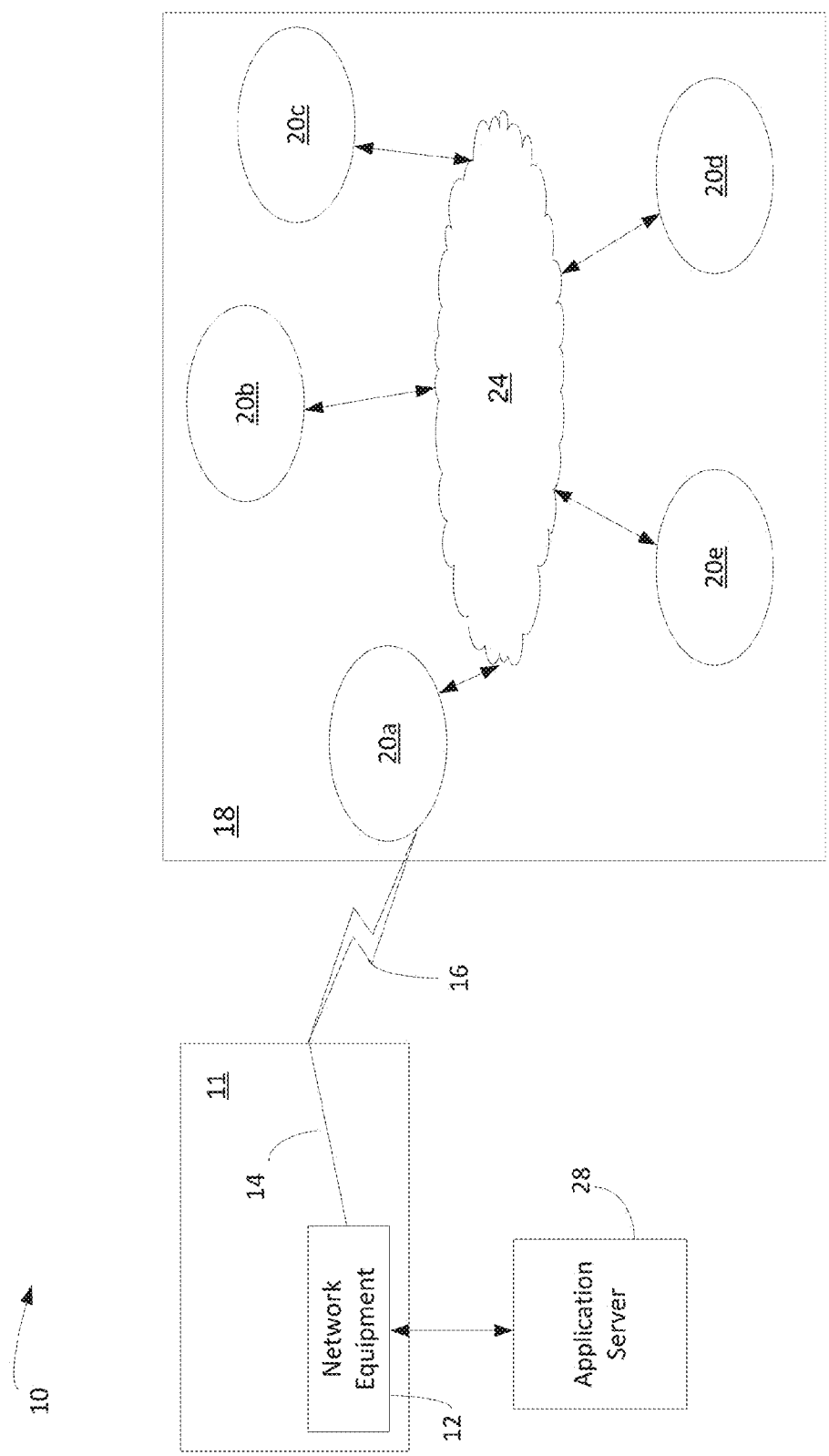
FIG. 1 is a system diagram of an exemplary embodiment of a system having multiple sensors connected to a network.

With reference to FIG. 1, there is shown a system 10 having a wireless network 11 and a sensor network 18. The wireless network 11 is generally known by those skilled in the art and includes one or more cellular antennas 14 and associated network equipment, referred to generically as network equipment 12, which is described in greater detail below. The network may be any type of wireless communication network, including but not limited to 4G LTE, GSM, CDMA, EDGE, and other wireless communications networks now known or to be developed in the future. For exemplary purposes only, the wireless network 11 will be described in terms of 4G LTE.

Also shown in FIG. 1 is a sensor network 18 comprising multiple sensors 20a, 20b, 20c, 20d, and 20e. Unless otherwise noted to distinguish among the various sensors, the above-referenced sensors will be hereinafter referred to as sensor(s) 20. Each of the sensors 20 is in communication with the other sensors 20 through a communications network 24. The communications network 24 may be any type of wired or wireless communications network 24, including but not limited to cellular networks, Wi-Fi networks, LANs, WANs, Wi-LANs, NFC networks, RFID, Bluetooth®, Zigbee®, or any other communication network that facilitates communication among the various sensors 20.

In the exemplary embodiment of FIG. 1, sensor 20a is shown as a supervisory sensor. A supervisory sensor is defined as a sensor that is in direct communication with the wireless network 11 through a wireless interface 16 from sensor 20A to a cellular antenna 14. This wireless interface may be a 4G LTE interface and may be configured for data transport from the wireless network 11 to the supervisory sensor 20a (defined herein as a downlink) and from the supervisory sensor 20a to the wireless network 11 (defined herein as an uplink). The supervisory sensor 20a may also be optionally in communication with one or more of an array of sensors 20b, 20c, 20d, and 20e. There is no theoretical limit to the number of sensors 20 (N) that may be in communication with supervisory sensor 20a and the ratio of sensors 20 to supervisory sensors may be N:1.

The sensors 20 may be any type of sensors, configured for use in any type of application. By way of example only and not limiting in any way, sensors 20 may be temperature sensors, location tracking sensors, fluid level sensors, inventory sensors, altitude sensors, speed sensors, chemical sensors, heat sensors, $CO_2$ sensors, motion sensors, or any other type of sensor 20 or alarm monitor.

Also shown in FIG. 1 is an application server 28 in communication with the wireless network 11. The application server 28 may be a collection of hardware and software configured to provide a particular application that may be designed to manage, control, collect and/or process data collected from the sensors 20. For example, an application server 28 may provide an application to monitor temperatures in a warehouse by collecting data from sensors 20.

To save power and to reduce unnecessary communications traffic, each of the sensors 20 may have at least two states, an inactive state and an active state. In an inactive state, there may be little or no network communications ongoing and a minimal amount of power consumed. In an active state, at least the paging channel may be monitored by the sensor. In an embodiment, the supervisory sensor 20a is always in an active state and sensors 20b, 20c, 20d and 20e are in an inactive state except when collecting sensor data and forwarding data to the supervisory sensor 20a. In another embodiment, supervisory sensor 20a may also be in an inactive state for a period of time. Each of the sensors 20 may become active based on a preprogrammed schedule or some other external event. In the case of the sensors 20, the active state may include monitoring the paging channel. It will be understood that the supervisory sensor 20a may be changed to be any other sensor in the sensor network 18 based on various criteria, including fault detection, traffic congestion, timing, or any other criteria.

In the case of downlink communications, the supervisory sensor 20a may be in an active state monitoring the paging channel. The supervisory sensor 20a may receive data communications which schedules the next sensor reading and reporting. The supervisory sensor 20a may communicate that schedule to the sensors 20b, 20c, 20d, and 20e, which once programmed with the schedule, may then enter an inactive state until such time as the sensors 20b, 20c, 20d, and 20e need to perform an activity in accordance with the schedule. The supervisory sensor may remain always active or itself may enter an inactive state for a period of time. At the pre-programmed time, the sensors 20b, 20c, 20d, and 20e will collect data and transmit that collected data to the supervisory sensor 20a. The supervisory sensor 20a will then establish an uplink communications path back to the network 11.

In another embodiment, the sensors 20 may be always in an active state. In such a state, the sensors 20 may be continually monitoring a system for alarms or other data. Each of the sensors 20 may then initiate an uplink transmission either periodically or aperiodically by transmitting the data to the supervisory sensor 20a which in turn will then establish an uplink communications path back to the network 11.

Figure 2:
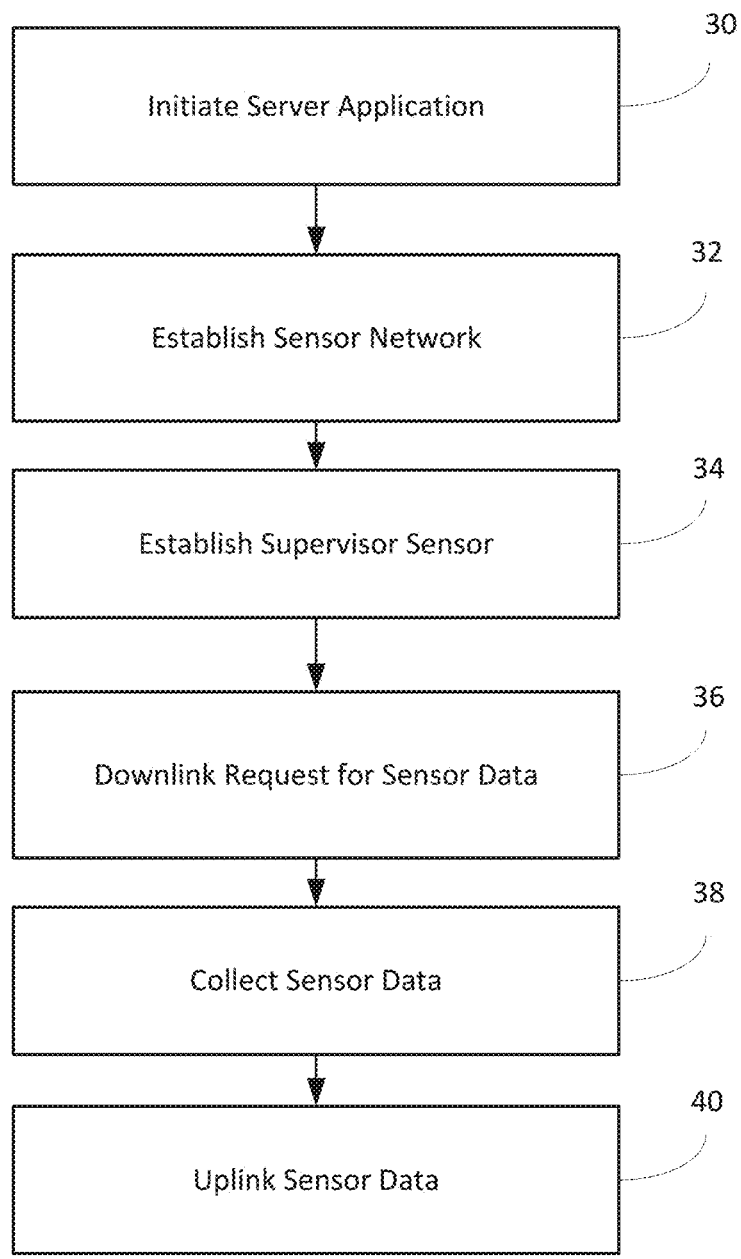
FIG. 2 is a flow chart describing an example embodiment of the use of multiple sensors connected to a network.

With reference to FIG. 2, there is shown a method of an embodiment. At 30, the server application is initiated at the application server 28. At 32, the sensor network 18 is established. The sensor network 18 will be programmed with instructions for collection of data or monitoring of a system and reporting data back to the application server 28. At 34 the supervisory sensor 20a is established as a supervisory sensor. At 36, the application server 28 initiates a request for sensor 20 data through downlink communications to the supervisory sensor 20a. At 38, the supervisory sensor 20a collects sensor data, including sensor data from sensors 20b, 20c, 20d, and 20e, if any. At 40, the supervisory sensor 20a transmits the sensor data of at 38 to the application server 28 through an uplink communications.

Figure 3:
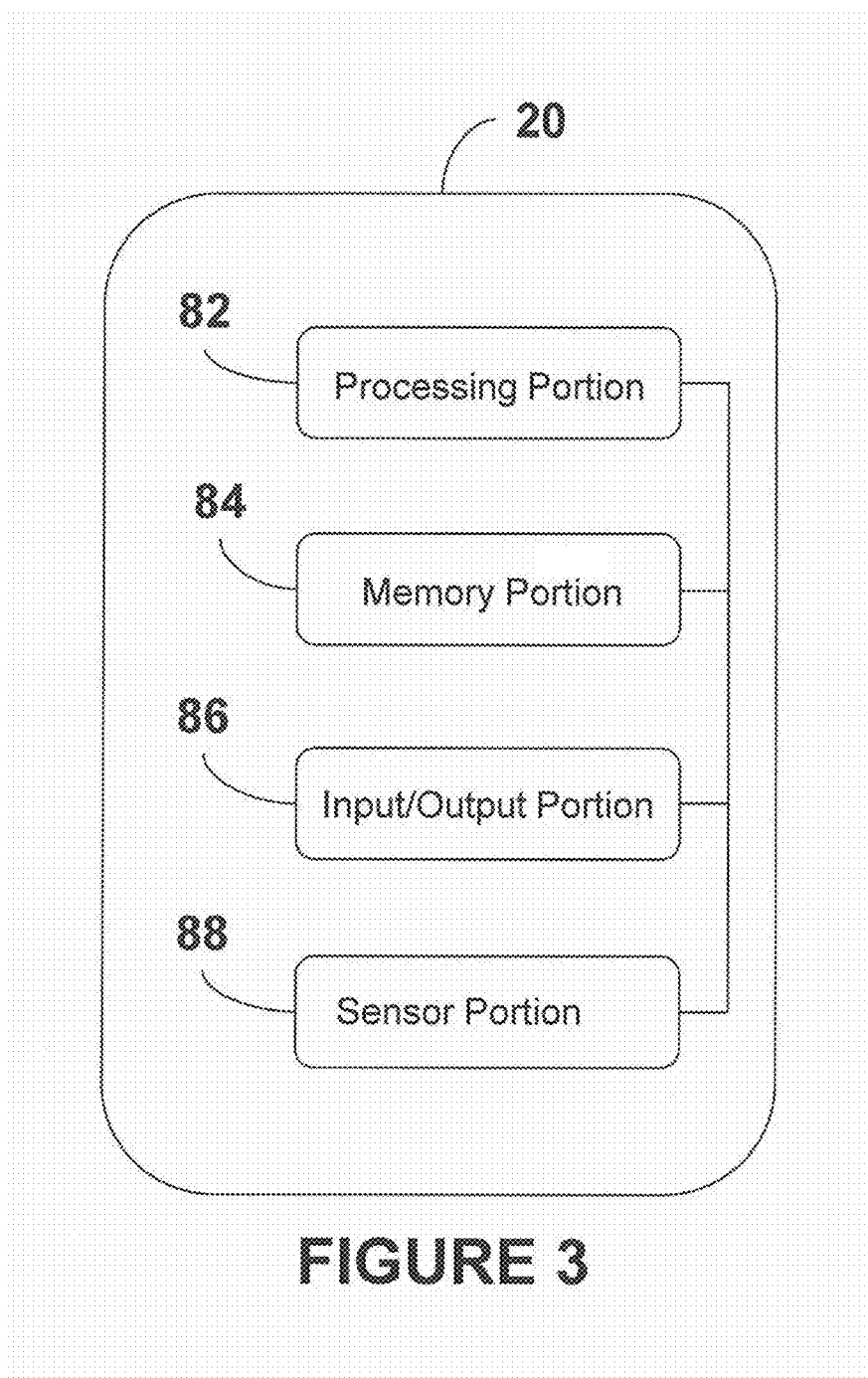
FIG. 3 is a block diagram of an example sensor device configured to be used in an exemplary sensor network.

FIG. 3 is a block diagram of an example sensor 20 configured to facilitate gathering data and transmitting data to another sensor 20 or to the wireless network 11. The sensor 20, however, may comprise any appropriate device, examples of which include a portable computing device, such as a laptop, a personal digital assistant ("PDA"), a portable phone (e.g., a cell phone or the like, a smart phone, a video phone), a portable email device, a portable gaming device, a TV, a DVD player, portable media player, (e.g., a portable music player, such as an MP3 player, a Walkman, etc.), a portable navigation device (e.g., GPS compatible device, A-GPS compatible device, etc.), or a combination thereof. The sensor 20 can include devices that are not typically thought of as portable, such as, for example, a public computing device, a navigation device installed in-vehicle, a set top box, or the like. The sensor 20 can include non-conventional computing devices, such as, for example, a kitchen appliance, a motor vehicle control (e.g., steering wheel), etc., or the like. As evident from the herein description a sensor device, a mobile device, or any portion thereof is not to be construed as software per se.

The sensor 20 may include any appropriate device, mechanism, software, and/or hardware for facilitating data messaging communications as described herein.

In an example embodiment, the sensor 20 comprises a processor and memory coupled to the processor. The memory may comprise executable instructions that when executed by the processor cause the processor to effectuate operations associated with text message generation for emergency services as a backup to voice communications.

In an example configuration, the sensor 20 comprises a processing portion 82, a memory portion 84, an input/output portion 86, and a sensor portion 88. Each portion of the sensor 20 comprises circuitry for performing functions associated with each respective portion. Thus, each portion can comprise hardware, or a combination of hardware and software. Accordingly, each portion of the sensor 20 is not to be construed as software per se. It is emphasized that the block diagram depiction of sensor 20 is exemplary and not intended to imply a specific implementation and/or configuration.

The processing portion 82, memory portion 84, and input/output portion 86 are coupled together to allow communications therebetween. In various embodiments, the input/output portion 86 comprises a receiver of the sensor 20, a transmitter of the sensor 20, or a combination thereof. The input/output portion 86 is capable of receiving and/or providing information pertaining to sensor data communications as described herein. In various configurations, the input/output portion 86 may receive and/or provide information via any appropriate means, such as, for example, optical means (e.g., infrared), electromagnetic means (e.g., RF, WI-FI, BLUETOOTH, ZIGBEE, etc.), acoustic means (e.g., speaker, microphone, ultrasonic receiver, ultrasonic transmitter), or a combination thereof.

The processing portion 82 may be capable of performing as described herein. In a basic configuration, the communications device 20 may include at least one memory portion 84. The memory portion 84 may comprise a storage medium having a tangible physical structure. Thus, the memory portion 84, as well as any computer-readable storage medium described herein, is not to be construed as a transient signal per se. Further, the memory portion 84, as well as any computer-readable storage medium described herein, is not to be construed as a propagating signal per se. The memory portion 84 may store any information utilized in conjunction with the text message generation for emergency services as a backup to voice communications as described herein. Depending upon the exact configuration and type of processor, the memory portion 84 may be volatile (such as some types of RAM), non-volatile (such as ROM, flash memory, etc.), or a combination thereof. The sensor 20 may include additional storage (e.g., removable storage and/or non-removable storage) including, but not limited to, tape, flash memory, smart cards, CD-ROM, digital versatile disks (DVD) or other optical storage, magnetic cassettes, magnetic tape, magnetic disk storage or other magnetic storage devices, universal serial bus (USB) compatible memory, or any other medium which can be used to store information and which can be accessed by the sensor 20.

Figure 4:
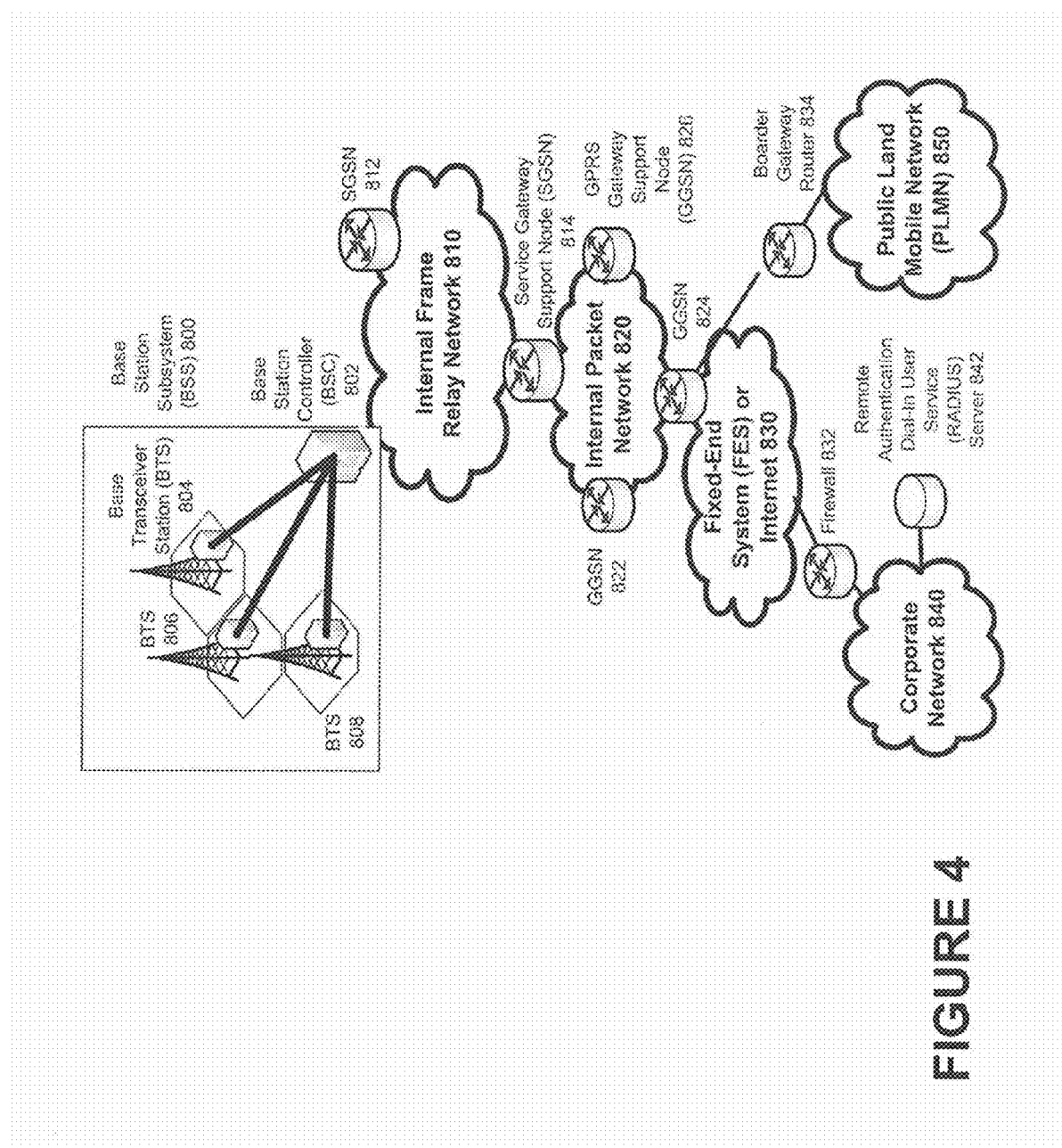
FIG. 4 depicts an overall block diagram of an example packet-based mobile cellular network environment, such as a GPRS network, within which text message generation for emergency services as a backup to voice communications may be implemented.

FIG. 4 depicts an overall block diagram of an example packet-based mobile cellular network environment, such as a GPRS network, within which control sensor networks may be implemented. In the example packet-based mobile cellular network environment shown in FIG. 4, there are a plurality of Base Station Subsystems ("BSS") 800 (only one is shown), each of which comprises a Base Station Controller ("BSC") 802 serving a plurality of Base Transceiver Stations ("BTS") such as BTSs 804, 806, and 808. BTSs 804, 806, 808, etc. are the access points where users of packet-based mobile devices become connected to the wireless network. In example fashion, the packet traffic originating from user devices is transported via an over-the-air interface to a BTS 808, and from the BTS 808 to the BSC 802. Base station subsystems, such as BSS 800, are a part of internal frame relay network 810 that can include Service GPRS Support Nodes ("SGSN") such as SGSN 812 and 814. Each SGSN is connected to an internal packet network 820 through which a SGSN 812, 814, etc. can route data packets to and from a plurality of gateway GPRS support nodes (GGSN) 822, 824, 826, etc. As illustrated, SGSN 814 and GGSNs 822, 824, and 826 are part of internal packet network 820. Gateway GPRS serving nodes 822, 824 and 826 mainly provide an interface to external Internet Protocol ("IP") networks such as Public Land Mobile Network ("PLMN") 850, corporate intranets 840, or Fixed-End System ("FES") or the public Internet 830. As illustrated, subscriber corporate network 840 may be connected to GGSN 824 via firewall 832; and PLMN 850 is connected to GGSN 824 via boarder gateway router 834. The Remote Authentication Dial-In User Service ("RADIUS") server 842 may be used for caller authentication when a user of a mobile cellular device calls corporate network 840.

Generally, there can be a several cell sizes in a GSM network, referred to as macro, micro, pico, femto and umbrella cells. The coverage area of each cell is different in different environments. Macro cells can be regarded as cells in which the base station antenna is installed in a mast or a building above average roof top level. Micro cells are cells whose antenna height is under average roof top level. Micro-cells are typically used in urban areas. Pico cells are small cells having a diameter of a few dozen meters. Pico cells are used mainly indoors. Femto cells have the same size as pico cells, but a smaller transport capacity. Femto cells are used indoors, in residential, or small business environments. On the other hand, umbrella cells are used to cover shadowed regions of smaller cells and fill in gaps in coverage between those cells.

Figure 5:
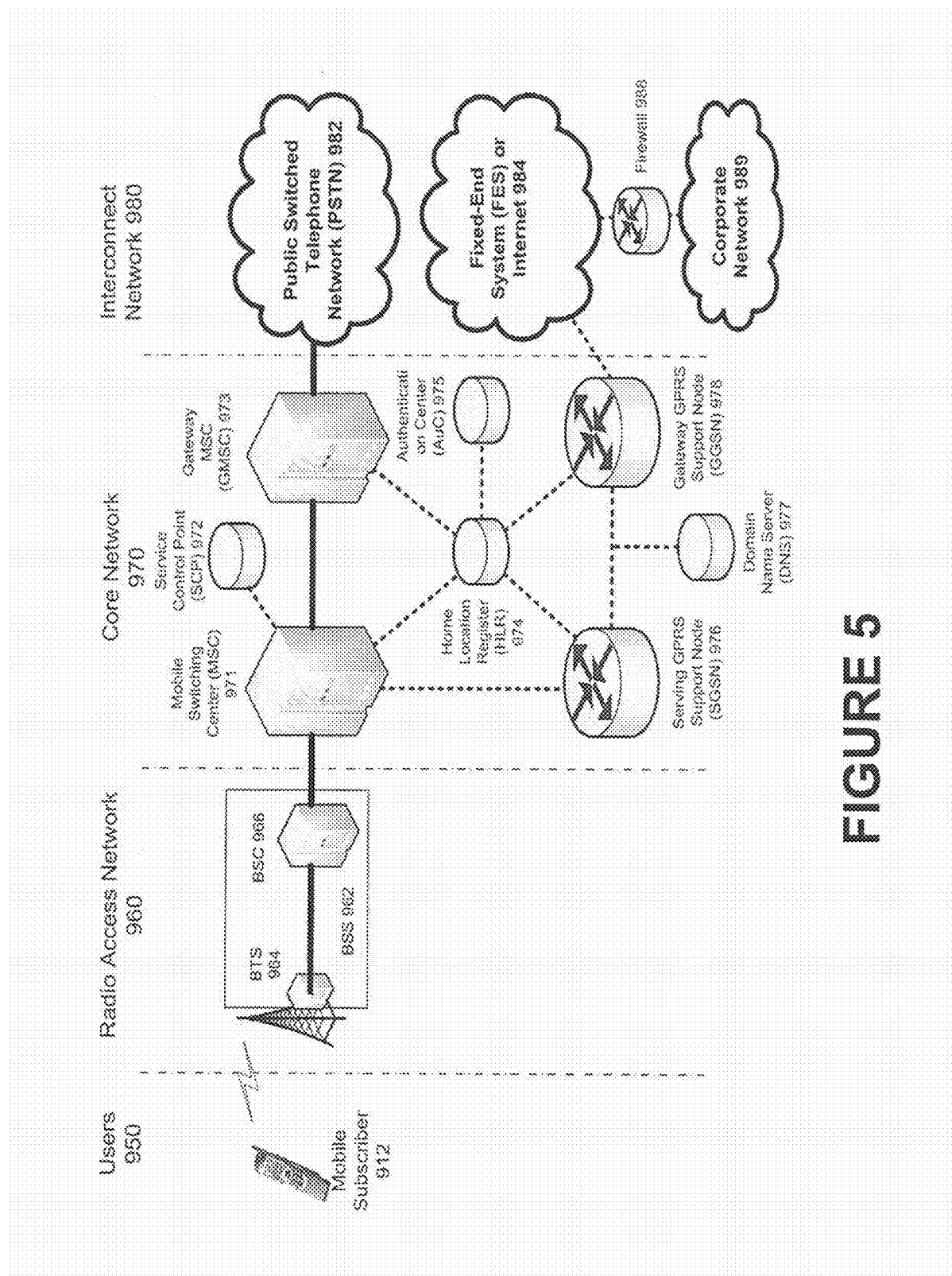
FIG. 5 illustrates an architecture of a typical GPRS network within which sensor network management can be implemented.

FIG. 5 illustrates an architecture of a typical GPRS network within which text message generation for emergency services as a backup to voice communications can be implemented. The architecture depicted in FIG. 5 is segmented into four groups: users 950, radio access network 960, core network 970, and interconnect network 980. Users 950 comprise a plurality of end users. Note, device 912 is referred to as a mobile subscriber in the description of network shown in FIG. 5. In an example embodiment, the device depicted as mobile subscriber 912 comprises a communications device (e.g., communications device 160). Radio access network 960 comprises a plurality of base station subsystems such as BSSs 962, which include BTSs 964 and BSCs 966. Core network 970 comprises a host of various network elements. As illustrated in FIG. 5, core network 970 may comprise Mobile Switching Center ("MSC") 971, Service Control Point ("SCP") 972, gateway MSC 973, SGSN 976, Home Location Register ("HLR") 974, Authentication Center ("AuC") 975, Domain Name Server ("DNS") 977, and GGSN 978. Interconnect network 920 also comprises a host of various networks and other network elements. As illustrated in FIG. 5, interconnect network 920 comprises Public Switched Telephone Network ("PSTN") 982, Fixed-End System ("FES") or Internet 984, firewall 988, and Corporate Network 989.

A mobile switching center can be connected to a large number of base station controllers. At MSC 971, for instance, depending on the type of traffic, the traffic may be separated in that voice may be sent to Public Switched Telephone Network ("PSTN") 982 through Gateway MSC ("GMSC") 973, and/or data may be sent to SGSN 976, which then sends the data traffic to GGSN 978 for further forwarding.

When MSC 971 receives call traffic, for example, from BSC 966, it sends a query to a database hosted by SCP 972. The SCP 972 processes the request and issues a response to MSC 971 so that it may continue call processing as appropriate.

The HLR 974 is a centralized database for users to register to the GPRS network. HLR 974 stores static information about the subscribers such as the International Mobile Subscriber Identity ("IMSI"), subscribed services, and a key for authenticating the subscriber. HLR 974 also stores dynamic subscriber information such as the current location of the mobile subscriber. Associated with HLR 974 is AuC 975. AuC 975 is a database that contains the algorithms for authenticating subscribers and includes the associated keys for encryption to safeguard the user input for authentication.

In the following, depending on context, the term "mobile subscriber" sometimes refers to the end user and sometimes to the actual portable device, such as a mobile device, used by an end user of the mobile cellular service. When a mobile subscriber turns on his or her mobile device, the mobile device goes through an attach process by which the mobile device attaches to an SGSN of the GPRS network. In FIG. 5, when mobile subscriber 912 initiates the attach process by turning on the network capabilities of the mobile device, an attach request is sent by mobile subscriber 912 to SGSN 976. The SGSN 976 queries another SGSN, to which mobile subscriber 912 was attached before, for the identity of mobile subscriber 912. Upon receiving the identity of mobile subscriber 912 from the other SGSN, SGSN 976 requests more information from mobile subscriber 912. This information is used to authenticate mobile subscriber 912 to SGSN 976 by HLR 974. Once verified, SGSN 976 sends a location update to HLR 974 indicating the change of location to a new SGSN, in this case SGSN 976. HLR 974 notifies the old SGSN, to which mobile subscriber 912 was attached before, to cancel the location process for mobile subscriber 912. HLR 974 then notifies SGSN 976 that the location update has been performed. At this time, SGSN 976 sends an Attach Accept message to mobile subscriber 912, which in turn sends an Attach Complete message to SGSN 976.

After attaching itself with the network, mobile subscriber 912 then goes through the authentication process. In the authentication process, SGSN 976 sends the authentication information to HLR 974, which sends information back to SGSN 976 based on the user profile that was part of the user's initial setup. The SGSN 976 then sends a request for authentication and ciphering to mobile subscriber 912. The mobile subscriber 912 uses an algorithm to send the user identification (ID) and password to SGSN 976. The SGSN 976 uses the same algorithm and compares the result. If a match occurs, SGSN 976 authenticates mobile subscriber 912.

Next, the mobile subscriber 912 establishes a user session with the destination network, corporate network 989, by going through a Packet Data Protocol ("PDP") activation process. Briefly, in the process, mobile subscriber 912 requests access to the Access Point Name ("APN"), for example, UPS.com, and SGSN 976 receives the activation request from mobile subscriber 912. SGSN 976 then initiates a Domain Name Service ("DNS") query to learn which GGSN node has access to the UPS.com APN. The DNS query is sent to the DNS server within the core network 970, such as DNS 977, which is provisioned to map to one or more GGSN nodes in the core network 970. Based on the APN, the mapped GGSN 978 can access the requested corporate network 989. The SGSN 976 then sends to GGSN 978 a Create Packet Data Protocol ("PDP") Context Request message that contains necessary information. The GGSN 978 sends a Create PDP Context Response message to SGSN 976, which then sends an Activate PDP Context Accept message to mobile subscriber 912.

Once activated, data packets of the call made by mobile subscriber 912 can then go through radio access network 960, core network 970, and interconnect network 980, in a particular fixed-end system or Internet 984 and firewall 988, to reach corporate network 989.

Figure 6:
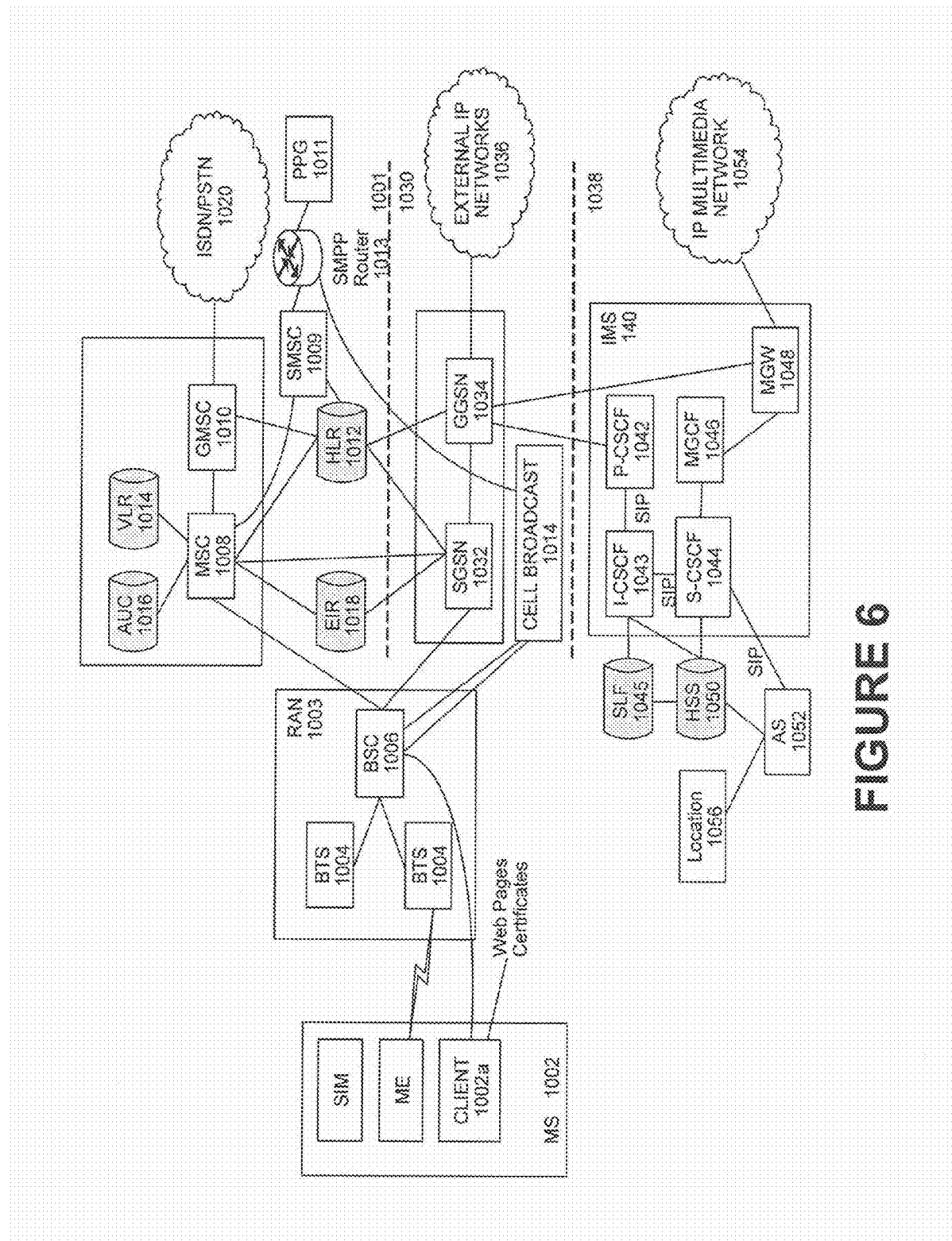
FIG. 6 illustrates an example block diagram view of a GSM/GPRS/IP multimedia network architecture within which sensor network management may be implemented.

FIG. 6 illustrates an example block diagram view of a GSM/GPRS/IP multimedia network architecture within which text message generation for emergency services as a backup to voice communications may be implemented. As illustrated, the architecture of FIG. 6 includes a GSM core network 1001, a GPRS network 1030 and an IP multimedia network 1038. The GSM core network 1001 includes a Mobile Station (MS) 1002, at least one Base Transceiver Station (BTS) 1004 and a Base Station Controller (BSC) 1006. The MS 1002 is physical equipment or Mobile Equipment (ME), such as a mobile phone or a laptop computer that is used by mobile subscribers, with a Subscriber identity Module (SIM) or a Universal Integrated Circuit Card (UICC). The SIM or UICC includes an International Mobile Subscriber Identity (IMSI), which is a unique identifier of a subscriber. The BTS 1004 is physical equipment, such as a radio tower, that enables a radio interface to communicate with the MS. Each BTS may serve more than one MS. The BSC 1006 manages radio resources, including the BTS. The BSC may be connected to several BTSs. The BSC and BTS components, in combination, are generally referred to as a base station (BSS) or radio access network (RAN) 1003.

The GSM core network 1001 also includes a Mobile Switching Center (MSC) 1008, a Gateway Mobile Switching Center (GMSC) 1010, a Home Location Register (HLR) 1012, Visitor Location Register (VLR) 1014, an Authentication Center (AuC) 1018, and an Equipment Identity Register (EIR) 1016. The MSC 1008 performs a switching function for the network. The MSC also performs other functions, such as registration, authentication, location updating, handovers, and call routing. The GMSC 1010 provides a gateway between the GSM network and other networks, such as an Integrated Services Digital Network (ISDN) or Public Switched Telephone Networks (PSTNs) 1020. Thus, the GMSC 1010 provides interworking functionality with external networks.

The HLR 1012 is a database that contains administrative information regarding each subscriber registered in a corresponding GSM network. The HLR 1012 also contains the current location of each MS. The VLR 1014 is a database that contains selected administrative information from the HLR 1012. The VLR contains information necessary for call control and provision of subscribed services for each MS currently located in a geographical area controlled by the VLR. The HLR 1012 and the VLR 1014, together with the MSC 1008, provide the call routing and roaming capabilities of GSM. The AuC 1016 provides the parameters needed for authentication and encryption functions. Such parameters allow verification of a subscriber's identity. The EIR 1018 stores security-sensitive information about the mobile equipment.

A Short Message Service Center (SMSC) 1009 allows one-to-one Short Message Service (SMS) messages to be sent to/from the MS 1002. A Push Proxy Gateway (PPG)

1011 is used to "push" (i.e., send without a synchronous request) content to the MS 1002. The PPG 1011 acts as a proxy between wired and wireless networks to facilitate pushing of data to the MS 1002. A Short Message Peer to Peer (SMPP) protocol router 1013 is provided to convert SMS-based SMPP messages to cell broadcast messages. SMPP is a protocol for exchanging SMS messages between SMS peer entities such as short message service centers. The SMPP protocol is often used to allow third parties, e.g., content suppliers such as news organizations, to submit bulk messages.

To gain access to GSM services, such as speech, data, and short message service (SMS), the MS first registers with the network to indicate its current location by performing a location update and IMSI attach procedure. The MS 1002 sends a location update including its current location information to the MSC/VLR, via the BTS 1004 and the BSC 1006. The location information is then sent to the MS's HLR. The HLR is updated with the location information received from the MSC/VLR. The location update also is performed when the MS moves to a new location area. Typically, the location update is periodically performed to update the database as location updating events occur.

The GPRS network 1030 is logically implemented on the GSM core network architecture by introducing two packet-switching network nodes, a serving GPRS support node (SGSN) 1032, a cell broadcast and a Gateway GPRS support node (GGSN) 1034. The SGSN 1032 is at the same hierarchical level as the MSC 1008 in the GSM network. The SGSN controls the connection between the GPRS network and the MS 1002. The SGSN also keeps track of individual MS's locations and security functions and access controls.

A Cell Broadcast Center (CBC) 14 communicates cell broadcast messages that are typically delivered to multiple users in a specified area. Cell Broadcast is one-to-many geographically focused service. It enables messages to be communicated to multiple mobile phone customers who are located within a given part of its network coverage area at the time the message is broadcast.

The GGSN 1034 provides a gateway between the GPRS network and a public packet network (PDN) or other IP networks 1036. That is, the GGSN provides interworking functionality with external networks, and sets up a logical link to the MS through the SGSN. When packet-switched data leaves the GPRS network, it is transferred to an external TCP-IP network 1036, such as an X.25 network or the Internet. In order to access GPRS services, the MS first attaches itself to the GPRS network by performing an attach procedure. The MS then activates a packet data protocol (PDP) context, thus activating a packet communication session between the MS, the SGSN, and the GGSN.

In a GSM/GPRS network, GPRS services and GSM services can be used in parallel. The MS can operate in one of three classes: class A, class B, and class C. A class A MS can attach to the network for both GPRS services and GSM services simultaneously. A class A MS also supports simultaneous operation of GPRS services and GSM services. For example, class A mobiles can receive GSM voice/data/SMS calls and GPRS data calls at the same time.

A class B MS can attach to the network for both GPRS services and GSM services simultaneously. However, a class B MS does not support simultaneous operation of the GPRS services and GSM services. That is, a class B MS can only use one of the two services at a given time.

A class C MS can attach for only one of the GPRS services and GSM services at a time. Simultaneous attachment and operation of GPRS services and GSM services is not possible with a class C MS.

A GPRS network 1030 can be designed to operate in three network operation modes (NOM1, NOM2 and NOM3). A network operation mode of a GPRS network is indicated by a parameter in system information messages transmitted within a cell. The system information messages dictates a MS where to listen for paging messages and how to signal towards the network. The network operation mode represents the capabilities of the GPRS network. In a NOM1 network, a MS can receive pages from a circuit switched domain (voice call) when engaged in a data call. The MS can suspend the data call or take both simultaneously, depending on the ability of the MS. In a NOM2 network, a MS may not receive pages from a circuit switched domain when engaged in a data call, since the MS is receiving data and is not listening to a paging channel. In a NOM3 network, a MS can monitor pages for a circuit switched network while received data and vice versa.

The IP multimedia network 1038 was introduced with 3GPP Release 5, and includes an IP multimedia subsystem (IMS) 1040 to provide rich multimedia services to end users. A representative set of the network entities within the IMS 1040 are a call/session control function (CSCF), a media gateway control function (MGCF) 1046, a media gateway (MGW) 1048, and a master subscriber database, called a home subscriber server (HSS) 1050. The HSS 1050 may be common to the GSM network 1001, the GPRS network 1030 as well as the IP multimedia network 1038.

The IP multimedia system 1040 is built around the call/session control function, of which there are three types: an interrogating CSCF (I-CSCF) 1043, a proxy CSCF (P-CSCF) 1042, and a serving CSCF (S-CSCF) 1044. The P-CSCF 1042 is the MS's first point of contact with the IMS 1040. The P-CSCF 1042 forwards session initiation protocol (SIP) messages received from the MS to an SIP server in a home network (and vice versa) of the MS. The P-CSCF 1042 may also modify an outgoing request according to a set of rules defined by the network operator (for example, address analysis and potential modification).

The I-CSCF 1043, forms an entrance to a home network and hides the inner topology of the home network from other networks and provides flexibility for selecting an S-CSCF. The I-CSCF 1043 may contact a subscriber location function (SLF) 1045 to determine which HSS 1050 to use for the particular subscriber, if multiple HSS's 1050 are present. The S-CSCF 1044 performs the session control services for the MS 1002. This includes routing originating sessions to external networks and routing terminating sessions to visited networks. The S-CSCF 1044 also decides whether an application server (AS) 1052 is required to receive information on an incoming SIP session request to ensure appropriate service handling. This decision is based on information received from the HSS 1050 (or other sources, such as an application server 1052). The AS 1052 also communicates to a location server 1056 (e.g., a Gateway Mobile Location Center (GMLC)) that provides a position (e.g., latitude/longitude coordinates) of the MS 1002.

The HSS 1050 contains a subscriber profile and keeps track of which core network node is currently handling the subscriber. It also supports subscriber authentication and authorization functions (AAA). In networks with more than one HSS 1050, a subscriber location function provides information on the HSS 1050 that contains the profile of a given subscriber.

The MGCF 1046 provides interworking functionality between SIP session control signaling from the IMS 1040 and ISUP/BICC call control signaling from the external GSTN networks (not shown). It also controls the media gateway (MGW) 1048 that provides user-plane interworking functionality (e.g., converting between AMR- and PCM-coded voice). The MGW 1048 also communicates with other IP multimedia networks 1054.

Push to Talk over Cellular (PoC) capable mobile phones register with the wireless network when the phones are in a predefined area (e.g., job site, etc.). When the mobile phones leave the area, they register with the network in their new location as being outside the predefined area. This registration, however, does not indicate the actual physical location of the mobile phones outside the pre-defined area.

Figure 7:
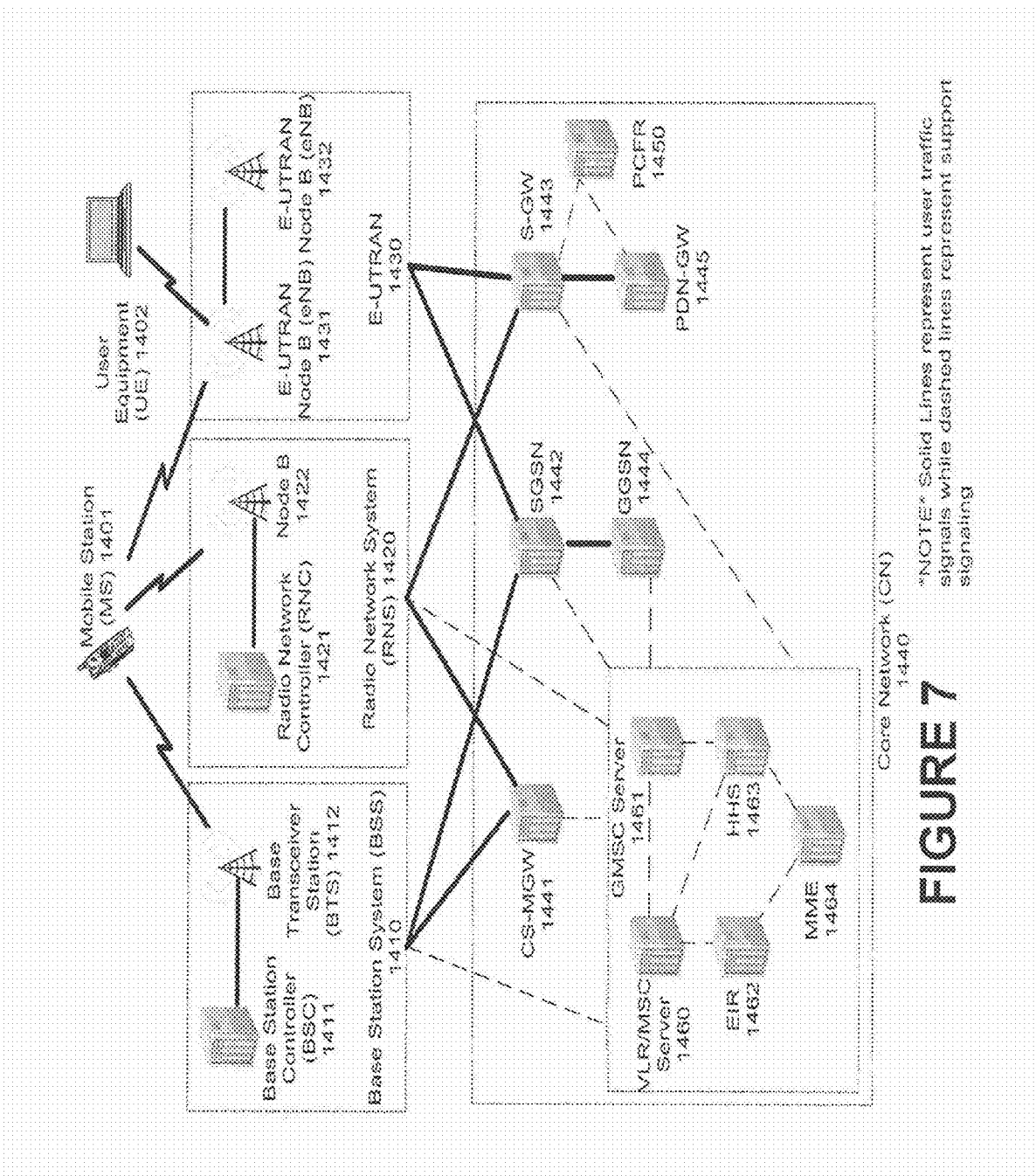
FIG. 7 illustrates a PLMN block diagram view of an example architecture in which sensor network management may be incorporated.

FIG. 7 illustrates a PLMN block diagram view of an example architecture in which text message generation for emergency services as a backup to voice communications may be incorporated. Mobile Station (MS) 1401 is the physical equipment used by the PLMN subscriber. In one illustrative embodiment, communications device 200 may serve as Mobile Station 1401. Mobile Station 1401 may be one of, but not limited to, a cellular telephone, a cellular telephone in combination with another electronic device or any other wireless mobile communication device.

Mobile Station 1401 may communicate wirelessly with Base Station System (BSS) 1410. BSS 1410 contains a Base Station Controller (BSC) 1411 and a Base Transceiver Station (BTS) 1412. BSS 1410 may include a single BSC 1411/BTS 1412 pair (Base Station) or a system of BSC/BTS pairs which are part of a larger network. BSS 1410 is responsible for communicating with Mobile Station 1401 and may support one or more cells. BSS 1410 is responsible for handling cellular traffic and signaling between Mobile Station 1401 and Core Network 1440. Typically, BSS 1410 performs functions that include, but are not limited to, digital conversion of speech channels, allocation of channels to mobile devices, paging, and transmission/reception of cellular signals.

Additionally, Mobile Station 1401 may communicate wirelessly with Radio Network System (RNS) 1420. RNS 1420 contains a Radio Network Controller (RNC) 1421 and one or more Node(s) B 1422. RNS 1420 may support one or more cells. RNS 1420 may also include one or more RNC 1421/Node B 1422 pairs or alternatively a single RNC 1421 may manage multiple Nodes B 1422. RNS 1420 is responsible for communicating with Mobile Station 1401 in its geographically defined area. RNC 1421 is responsible for controlling the Node(s) B 1422 that are connected to it and is a control element in a UMTS radio access network. RNC 1421 performs functions such as, but not limited to, load control, packet scheduling, handover control, security functions, as well as controlling Mobile Station 1401's access to the Core Network (CN) 1440.

The evolved UMTS Terrestrial Radio Access Network (E-UTRAN) 1430 is a radio access network that provides wireless data communications for Mobile Station 1401 and User Equipment 1402. E-UTRAN 1430 provides higher data rates than traditional UMTS. It is part of the Long Term Evolution (LTE) upgrade for mobile networks and later releases meet the requirements of the International Mobile Telecommunications (IMT) Advanced and are commonly known as a 4G networks. E-UTRAN 1430 may include of series of logical network components such as E-UTRAN Node B (eNB) 1431 and E-UTRAN Node B (eNB) 1432. E-UTRAN 1430 may contain one or more eNBs. User Equipment 1402 may be any user device capable of connecting to E-UTRAN 1430 including, but not limited to, a personal computer, laptop, mobile device, wireless router, or other device capable of wireless connectivity to E-UTRAN 1430. The improved performance of the E-UTRAN 1430 relative to a typical UMTS network allows for increased bandwidth, spectral efficiency, and functionality including, but not limited to, voice, high-speed applications, large data transfer and IPTV, while still allowing for full mobility.

An example embodiment of a mobile data and communication service that may be implemented in the PLMN architecture described in FIG. 7 is the Enhanced Data rates for GSM Evolution (EDGE). EDGE is an enhancement for GPRS networks that implements an improved signal modulation scheme known as 8-PSK (Phase Shift Keying). By increasing network utilization, EDGE may achieve up to three times faster data rates as compared to a typical GPRS network. EDGE may be implemented on any GSM network capable of hosting a GPRS network, making it an ideal upgrade over GPRS since it may provide increased functionality of existing network resources. Evolved EDGE networks are becoming standardized in later releases of the radio telecommunication standards, which provide for even greater efficiency and peak data rates of up to 1 Mbit/s, while still allowing implementation on existing GPRS-capable network infrastructure.

Typically Mobile Station 1401 may communicate with any or all of BSS 1410, RNS 1420, or E-UTRAN 1430. In a illustrative system, each of BSS 1410, RNS 1420, and E-UTRAN 1430 may provide Mobile Station 1401 with access to Core Network 1440. The Core Network 1440 may include of a series of devices that route data and communications between end users. Core Network 1440 may provide network service functions to users in the Circuit Switched (CS) domain, the Packet Switched (PS) domain or both. The CS domain refers to connections in which dedicated network resources are allocated at the time of connection establishment and then released when the connection is terminated. The PS domain refers to communications and data transfers that make use of autonomous groupings of bits called packets. Each packet may be routed, manipulated, processed or handled independently of all other packets in the PS domain and does not require dedicated network resources.

The Circuit Switched-Media Gateway Function (CS-MGW) 1441 is part of Core Network 1440, and interacts with Visitor Location Register (VLR) and Mobile-Services Switching Center (MSC) Server 1460 and Gateway MSC Server 1461 in order to facilitate Core Network 1440 resource control in the CS domain. Functions of CS-MGW 1441 include, but are not limited to, media conversion, bearer control, payload processing and other mobile network processing such as handover or anchoring. CS-MGW 1440 may receive connections to Mobile Station 1401 through BSS 1410, RNS 1420 or both.

Serving GPRS Support Node (SGSN) 1442 stores subscriber data regarding Mobile Station 1401 in order to facilitate network functionality. SGSN 1442 may store subscription information such as, but not limited to, the International Mobile Subscriber Identity (IMSI), temporary identities, or Packet Data Protocol (PDP) addresses. SGSN 1442 may also store location information such as, but not limited to, the Gateway GPRS Support Node (GGSN) 1444 address for each GGSN where an active PDP exists. GGSN 1444 may implement a location register function to store subscriber data it receives from SGSN 1442 such as subscription or location information.

Serving Gateway (S-GW) 1443 is an interface which provides connectivity between E-UTRAN 1430 and Core Network 1440. Functions of S-GW 1443 include, but are not limited to, packet routing, packet forwarding, transport level packet processing, event reporting to Policy and Charging Rules Function (PCRF) 1450, and mobility anchoring for inter-network mobility. PCRF 1450 uses information gathered from S-GW 1443, as well as other sources, to make applicable policy and charging decisions related to data flows, network resources and other network administration functions. Packet Data Network Gateway (PDN-GW) 1445 may provide user-to-services connectivity functionality including, but not limited to, network-wide mobility anchoring, bearer session anchoring and control, and IP address allocation for PS domain connections.

Home Subscriber Server (HSS) 1463 is a database for user information, and stores subscription data regarding Mobile Station 1401 or User Equipment 1402 for handling calls or data sessions. Networks may contain one HSS 1463 or more if additional resources are required. Example data stored by HSS 1463 include, but is not limited to, user identification, numbering and addressing information, security information, or location information. HSS 1463 may also provide call or session establishment procedures in both the PS and CS domains.

The VLR/MSC Server 1460 provides user location functionality. When Mobile Station 1401 enters a new network location, it begins a registration procedure. A MSC Server for that location transfers the location information to the VLR for the area. A VLR and MSC Server may be located in the same computing environment, as is shown by VLR/MSC Server 1460, or alternatively may be located in separate computing environments. A VLR may contain, but is not limited to, user information such as the IMSI, the Temporary Mobile Station Identity (TMSI), the Local Mobile Station Identity (LMSI), the last known location of the mobile station, or the SGSN where the mobile station was previously registered. The MSC server may contain information such as, but not limited to, procedures for Mobile Station 1401 registration or procedures for handover of Mobile Station 1401 to a different section of the Core Network 1440. GMSC Server 1461 may serve as a connection to alternate GMSC Servers for other mobile stations in larger networks.

Equipment Identity Register (EIR) 1462 is a logical element which may store the International Mobile Equipment Identities (IMEI) for Mobile Station 1401. In a typical embodiment, user equipment may be classified as either "white listed" or "black listed" depending on its status in the network. In one embodiment, if Mobile Station 1401 is stolen and put to use by an unauthorized user, it may be registered as "black listed" in EIR 1462, preventing its use on the network. Mobility Management Entity (MME) 1464 is a control node which may track Mobile Station 1401 or User Equipment 1402 if the devices are idle. Additional functionality may include the ability of MME 1464 to contact an idle Mobile Station 1401 or User Equipment 1402 if retransmission of a previous session is required.

While example embodiments of establishing control of sensor networks have been described in connection with various computing devices/processors, the underlying concepts may be applied to any computing device, processor, or system capable of implementing text message generation for emergency services as a backup to voice communications. The various techniques described herein can be implemented in connection with hardware or software or, where appropriate, with a combination of both. Thus, the methods and apparatuses of controlling sensor networks may be implemented, or certain aspects or portions thereof, can take the form of program code (i.e., instructions) embodied in tangible storage media having a tangible physical structure. Examples of tangible storage media include floppy diskettes, CD-ROMs, DVDs, hard drives, or any other tangible machine-readable storage medium (computer-readable storage medium). Thus, a computer-readable storage medium is not a transient signal per se. When the program code is loaded into and executed by a machine, such as a computer, the machine becomes an apparatus for implementing text message generation for emergency services as a backup to voice communications. In the case of program code execution on programmable computers, the computing device will generally include a processor, a storage medium readable by the processor (including volatile and non-volatile memory and/or storage elements), at least one input device, and at least one output device. The program(s) can be implemented in assembly or machine language, if desired. The language can be a compiled or interpreted language, and combined with hardware implementations.

The methods and apparatuses for controlling sensor networks also may be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes an apparatus for implementing text message generation for emergency services as a backup to voice communications. When implemented on a general-purpose processor, the program code combines with the processor to provide a unique apparatus that operates to invoke the functionality of text message generation for emergency services as a backup to voice communications.

While control of sensor networks has been described in connection with the various embodiments of the various figures, it is to be understood that other similar embodiments can be used or modifications and additions can be made to the described. For example, one skilled in the art will recognize that control of sensor networks as described in the present application may apply to any environment, whether wired or wireless, and may be applied to any number of such devices connected via a communications network and interacting across the network. Therefore, described embodiments should not be limited to any single embodiment, but rather should be construed in breadth and scope in accordance with the appended claims.

What is claimed:

1. A network comprising:
    a supervisory sensor in communication with a server over a wireless network; and
    a non-supervisory sensor that communicates with the wireless network through the supervisory sensor, and wherein the supervisory sensor stops communication with the wireless network and transfers a communication function to the non-supervisory sensor based on a command from the server.

2. The network of claim 1, wherein the supervisory sensor comprises a temperature sensor, location tracking sensor, or fluid level sensor.

3. The network of claim 1, wherein the supervisory sensor collects data from the non-supervisory sensor.

4. The network of claim 3, wherein the supervisory sensor transmits the collected data from the non-supervisory sensor to the server on the wireless network.

5. The network of claim 1, wherein the supervisory sensor changes to an inactive state based on one or more criteria, wherein the one or more criteria comprises at least one of time of day, location, or network congestion.

6. The network of claim 1, wherein the supervisory sensor comprises altitude sensors, speed sensors, heat sensors, CO2 sensors, or motion sensors.

7. The network of claim 1, wherein the server monitors an environment by collecting data from the non-supervisory sensor.

8. A supervisory sensor comprising:
a processor; and
a memory coupled with the processor, the memory comprising executable instructions that when executed by the processor cause the processor to effectuate operations comprising:
receiving data from a non-supervisory sensor via a first communication interface;
transmitting the data to a server via a second communication interface connected with a wireless network; and
disabling the second communication interface to the wireless network based on a command from the server to transfer supervisory functions to the non-supervisory sensor.

9. The supervisory sensor of claim 8, the operations further comprising changing to an inactive state based on one or more criteria.

10. The supervisory sensor of claim 8, the operations further comprising changing to an inactive state based on one or more criteria, wherein the one or more criteria comprises at least one of time of day, location, or network congestion.

11. The supervisory sensor of claim 8, the operations further comprising cycling between an active state and an inactive state.

12. The supervisory sensor of claim 8, wherein the supervisory sensor changes to another sensor based on one or more criteria that comprise fault detection, traffic congestion, or timing.

13. The supervisory sensor of claim 8, wherein the non-supervisory sensor comprises a temperature sensor, location tracking sensor, fluid level sensor, inventory sensor, altitude sensor, speed sensor, chemical sensor, heat sensor, CO2 sensor, or motion sensor.

14. The supervisory sensor of claim 8, wherein the non-supervisory sensor changes to another sensor based on one or more criteria that comprise fault detection, traffic congestion, or timing.

15. A computer-readable storage medium that is not a signal comprising computer executable instructions that when executed by a computing device cause said computing device to effectuate operations comprising:
receiving, by supervisory sensor, data from a non-supervisory sensor via a first communication interface;
transmitting, by the supervisory sensor, the data to a server via a second communication interface connected with a wireless network; and
disabling the second communication interface to the wireless network based on a command from the server to transfer supervisory functions to the non-supervisory sensor.

16. The computer-readable storage medium that is not a signal of claim 15, the operations further comprising changing to an inactive state based on one or more criteria.

17. The computer-readable storage medium that is not a signal of claim 15, the operations further comprising changing to an inactive state based on one or more criteria, wherein the one or more criteria comprises at least one of time of day, location, or network congestion.

18. The computer-readable storage medium that is not a signal of claim 15, wherein the supervisory sensor changes to a sensor that is not supervisory based on one or more criteria.

19. The computer-readable storage medium that is not a signal of claim 15, wherein the supervisory sensor changes to a sensor that is not supervisory based on one or more criteria that comprise fault detection, traffic congestion, or timing.

20. The computer-readable storage medium that is not a signal of claim 15, wherein the non-supervisory sensor changes to a sensor that is supervisory based on one or more criteria that comprise fault detection, traffic congestion, or timing.

\* \* \* \* \*